Figure 1:
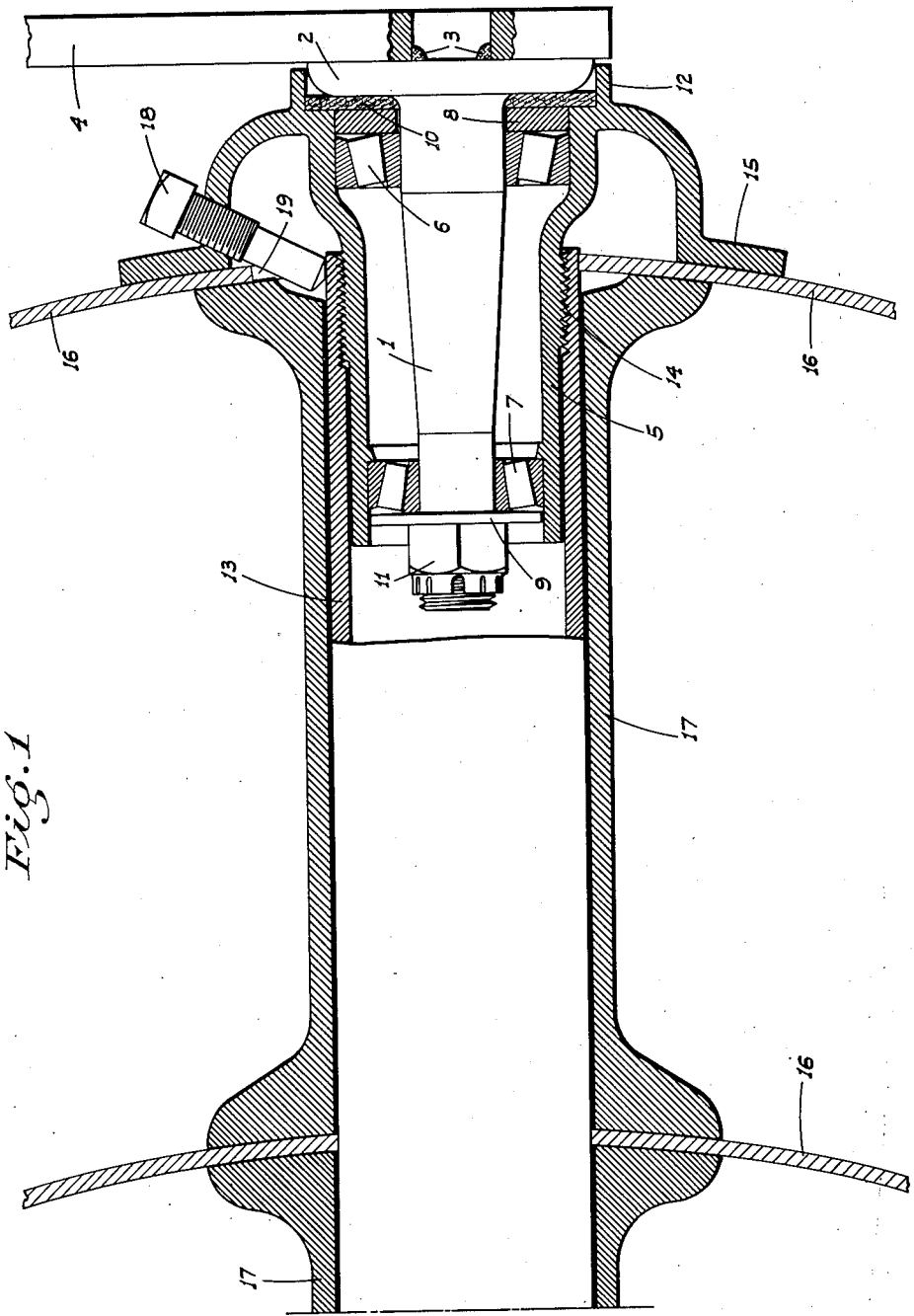

Nov. 11, 1941.   T. G. SCHMEISER   2,262,654

MOUNTING ASSEMBLY FOR ROTARY ELEMENTS

Filed May 13, 1940

INVENTOR
T. G. Schmeiser
BY
ATTORNEYS

Patented Nov. 11, 1941

2,262,654

UNITED STATES PATENT OFFICE 2,262,654

MOUNTING ASSEMBLY FOR ROTARY ELEMENTS

Theodore G. Schmeiser, Fresno, Calif.

Application May 13, 1940, Serial No. 334,805

4 Claims. (Cl. 308—181)

This invention relates generally to an improved bearing and mounting assembly for rotary elements, and in particular the invention is directed to an assembly for the purpose which is adapted for use with various types of rotary parts such as disc gangs, pulleys or rollers, implement wheels, etc.

The principal object of the invention is to provide a bearing and mounting as above, which is so constructed as to provide low initial cost, ease of assembly, long life with a minimum of attention, and yet adequate strength to withstand heavy loads without failure.

Another object of the invention is to provide a bearing and mounting assembly, for rotary parts, which includes a fixed spindle associated with a rotary housing; there being a centralizing member adapted to be mounted with the rotary part, said member cooperating in threaded engagement with said housing.

A further object of the invention is to produce a device which will be exceedingly effective for the purpose for which it is designed.

These objects I accomplish by means of such structure and relative arrangement of parts as will fully appear by a perusal of the following specification and claims.

The figure on the drawing is a sectional elevation illustrating the invention as embodied in a disc gang.

Referring now more particularly to the characters of reference on the drawing, the disc gang is provided at each end with the improved bearing and mounting assembly; each such assembly comprising a spindle 1 projecting horizontally and inwardly from an enlarged, annular head 2 fixed, as by welding 3, on the conventional end bracket or arm 4 of the implement.

A tubular housing 5 of slightly less length than the spindle surrounds the same in rotatable relation; roller bearing units 6 and 7 being fitted in the end portions of housing 5 and cooperatively engaging the spindle. Retaining washers 8 and 9 respectively secure the bearing units in place; a felt grease retaining ring 10 being disposed between washer 8 and head 2, while a securing and adjustment nut 11 is threaded on the inner end of the spindle and abuts against washer 9. The end of the housing 5 adjacent head 2 is formed with an annular protective skirt 12 which overlaps the ring 10 and the periphery of said head.

The housing 5 is disposed with a close fit in one end of a steel tube 13 which forms the axle of the disc gang; the housing for a portion of its length being threaded into said tube, as at 14. An annular disc engaging flange 15 is formed on housing 5 at the end adjacent head 2; said flange being formed to symmetrically engage the endmost disc 16 of the gang which is supported on and located by the steel tube 13. The disc 16 is clamped between flange 15 and the end of the adjacent disc securing sleeve or spool 17, a number of which spools separate and secure the several discs comprising the gang as usual. The desired clamping action is effected by the extent housings 5 are run into the respective ends of tube 13.

When the flanges 15 are once properly adjusted to clamping position, each housing 5 is locked relative to tube 13 by means of a set screw 18 threaded through flange 15 and seated against the outside of tube 13 adjacent its end; the disc 16 having an opening 19 through which the set screw passes. By reason of such arrangement there can be no relative rotation between housing 15 and tube 13, or between disc 16 and said housing and tube.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a disc gang, a tubular axle, a supporting arm adjacent one end of said axle, a spindle fixed on and projecting from said arm, a cylindrical housing turnably mounted on said spindle, the housing being threaded into said end of the axle, a disc located and supported by the axle adjacent said one end thereof, a disc clamping flange formed on the housing beyond said end of the axle and engaging the adjacent face of the disc, and a disc clamping spool on the axle engaging the other face of the disc.

2. In a disc gang, a tubular axle, a supporting arm adjacent one end of said axle, a spindle fixed on and projecting from said arm, a cylindrical housing turnably mounted on said spindle, the housing being threaded into said end of the axle, a disc located and supported by the axle adjacent said one end thereof, a disc clamping flange formed on the housing beyond said end of the axle and engaging the adjacent face of the disc, a disc clamping spool on the axle engaging the other face of the disc, and means to prevent relative rotation between the housing and axle.

3. A device as in claim 2 in which said means to prevent relative rotation comprises a set screw threaded through the disc clamping flange and extending into engagement with said axle.

4. A device as in claim 2 in which said means to prevent relative rotation comprises a set screw threaded through the disc clamping flange and extending into engagement with said axle; the set screw being disposed at an angle converging with the disc, and the disc having an opening through which the set screw extends.

THEODORE G. SCHMEISER.